United States Patent
Brygynevych

(10) Patent No.: US 6,954,402 B2
(45) Date of Patent: Oct. 11, 2005

(54) METHOD OF WAVE DIAGNOSTICS OF THE OIL-AND-GAS-DEPOSIT

(76) Inventor: Valentyn Oleksandrovych Brygynevych, L7 Gordytakogo Str. app. 3, Ivano-Frankivsk, 76018 (UA)

( * ) Notice: Subject to any disclaimer, the term of this patent is extended or adjusted under 35 U.S.C. 154(b) by 120 days.

(21) Appl. No.: 10/649,941

(22) Filed: Aug. 28, 2003

(65) Prior Publication Data

US 2004/0054478 A1 Mar. 18, 2004

(30) Foreign Application Priority Data

Aug. 30, 2002 (UA) .................................. 2002087095

(51) Int. Cl.⁷ .................................................. G01V 1/28
(52) U.S. Cl. .............................. 367/25; 367/75; 367/37; 702/14
(58) Field of Search ...................... 367/25, 57, 75

(56) References Cited

U.S. PATENT DOCUMENTS

| | | | | |
|---|---|---|---|---|
| 4,375,090 A | * | 2/1983 | Thompson et al. ........... 367/73 |
| 4,969,130 A | * | 11/1990 | Wason et al. .................. 367/73 |
| 5,648,939 A | * | 7/1997 | Folstad et al. ................. 367/73 |
| 5,737,220 A | * | 4/1998 | Miller .......................... 702/14 |
| 5,796,678 A | * | 8/1998 | Pisetski ........................ 367/38 |
| 6,028,820 A | * | 2/2000 | Pisetski ........................ 367/38 |
| 2003/0125878 A1 | * | 7/2003 | Bakulin et al. ............... 702/14 |

* cited by examiner

*Primary Examiner*—Bernarr E. Gregory
*Assistant Examiner*—Scott A. Hughes
(74) *Attorney, Agent, or Firm*—Nath & Associates PLLC; Gary M. Nath; Gregory B. Kang

(57) ABSTRACT

A method of diagnostics of oil-and-gas deposit for seismic survey on the basis of the complex of waves of the different types. It is performed by means of the insonification of the vicinity of the borehole by the seismic waves, the recording of the displacement vectors of the direct longtidunial and shear waves using the three-component seismic profiling in the investigated borehole, the data processing of the detailed profiling for the obtaining of the dynamical, rheological and absorbing parameters of the rock, and the geological interpretation of the above-mentioned parameters for the obtaining of the quantitative estimates of the reservoir and fluid-saturated properties of the rocks for each observation point lengthways depth of the borehole.

13 Claims, 6 Drawing Sheets

Special marks: 1 – argillite; 2 – aleurolite; 3 – clay sandstone; 4 – limestone.

Special marks: 1 – argillite; 2 – aleurolite; 3 – clay sandstone; 4 – limestone.

METHOD OF WAVE DIAGNOSTICS OF THE OIL-AND-GAS-DEPOSIT

BACKGROUND OF THE INVENTION

The given invention refers to the area of the exploration geophysical methods, in particular, the seismic survey of the oil-and-gas deposits on the basis of the complex of waves of the different types. The invention is intended for diagnostics of the reservoir and fluid-saturated properties of the rocks, situated in the vicinity of the borehole. Further diagnostics include the reception of the quantitative estimates of the significant oil-field parameters for the identification of the image of the oil-and-gas deposit, and the subsequent effective baring of the productive layers in the time of exploration and development drilling of the boreholes as well as for the usage of the obtained data for the calculation of the oil and gas reserves.

The method is especially effective for diagnostics of the fissured reservoir (limestones, sandstones) because it allows the measurement of such parameters of the fissured rock as the average length and linear density of fractures, fissured porosity and permeability, fissured residual water saturation and fluid saturation, while the majority of the last cannot be determined with the use of the standard complex of the well logging methods. Besides, the method can be used for the investigation of the lithological and petrophysical parameters of the rocks in situ.

The method of the vibroseism exploration of the oil-and-gas deposits (Ru, U.S. Pat. No. 2,045,079 GO 1V 1/00, 1995) is known, according to which they generate the seismic oscillations with the frequency of (2–20) Hz, register the seismic responses of the earth before and after the excitation of oscillations on three components not less than two geophones simultaneously, and on sharp magnification of the extreme of the received amplitude-frequency characteristics of the seismic response at the frequencies of (2–6) Hz make the decision about the presence of the oil-and-gas deposit. The method allows the detection of the presence of the oil-and-gas deposit in some cases, though its efficiency is not high as far as the amplitude extreme is the parameter depending on the different factors. In particular, the amplitude values essentially depend on the conditions of the excitation and registration, the absence of data about which can give the false information about the presence of the oil-and-gas deposit.

Therefore, for the identification of installation on such the parameter as the amplitude extreme it is necessary to install the level of amplitude discrimination (or threshold), and for the correct choice of the threshold magnitude the additional information on the statistical properties of useful signal and noise is required together with the distribution of probabilities of the amplitudes excess of the useful signal and noise of various levels. The method does not envisage the control over the change of the conditions of the wave generation, and also demands the major expenditures of the time at the usage of additional devices, as existing vibrators cannot generate the seismic waves in the infrasonic range with the required frequency of the oscillations excitations.

The method of the investigation of hydrocarbon deposits on the basis of the effects of their nonideal elasticity is known (Rapoport M. B., Ryzhkov V. I. 1992–2000. Scientific Reports at International Geophysical Conferences of SEG, IGRC, EAGE etc). In the above-mentioned method the experimental fact is used, that the hydrocarbon-saturated porous medium has tall absorption properties. It is supposed, that the effects of seismic nonelasticity of the rocks are shown by means of frequency - dependent absorption and dispersion of the phase velocities of the seismic waves, the values of which are calculated according to the data of the surface and borehole seismic survey. On the basis of method offered by the authors, the investigations of seismic absorbtion according to the surface-seismic survey data (of 2D/3D) were implemented, moreover for the analysis of the absorption parameters the nonstacking seismic data and traceability of the seismic reflections on the time cross sections were used. The received values of the absorption parameters are used as the indicators of the hydrocarbon presence in the surface seismic survey. The vertical seismic profiling (VSP) data in the productive boreholes are regarded as parametric at the analysis of seismic nonelasticity and are applied for the separation of the productive thicknesses skipped in the time of well logging, while the borehole observations of VSP, the abnormality absorption parameters and velocity dispersions received by the surface seismic survey, are immediately connected with the oil-and-gas deposits. For the definition of the threshold level, which corresponds to the outline of the deposit, the values of the indicator parameters are calibrated permanently over the results of the tests of the productive boreholes. The usage of the given method allows to define the most perspective in the oil-and-gas-bearing relations of the investigated area, and at the presence of the boreholes also allows to delineate the productive sections.

However, the above-mentioned method uses as calculated of the surface seismic survey data and includes the condition of the mandatory adapting of the investigation results with the well logging data. Because of lapses in the time of parametric measurement and in the presence only the effective attenuations estimates of the amplitudes method can give the erroneous prognosis concerning the discovery of layers promising in the oil-and-gas-bearing relation.

Most close according to the technical essence to the declared invention is "A method of the determination of the theological properties of solid-liquid mediums by means of the multiwave borehole seismic survey" (UA, patent No 718 C1 G O1 V 1/40, G 01 V 1/00. 15.12.93. Bull. No 2), implementing the principles of borehole seismic survey (prototype). The essence of the invention consists in the following. In the vicinity of the borehole the plane longitudinal wave is formed by means of the seismic oscillations excitation by the near-surface sources. By means of the three-component geophones of the displacements (or stresses) the dynamical characteristics of the direct seismic waves in the investigated borehole are recorded, at the same time one of the geophones is oriented along the normal line to the plane wavefront of the longitudinal wave. Then, according to the received kinematic characteristics of the longitudinal and shear (or converted) waves the numeral processing of the dynamical characteristics of the direct longitudinal wave is fulfilled. For this purpose they execute the separation of the monotype time signals for the registered borehole components of displacements (or stresses) by pointwise deduction out of the axial component (z-component component) and the tangential component (x,y-components) of the displacements (or stresses) with the obtaining of the significant parametric estimates of the separate signals in the future.

After that according to the known analytical relationships the kinematic and dynamical parameters are transformed in respect to the bedded values with the further determination of the theological parameters of the rocks, as well as the absorption parameters of the longitudinal wave for each observation point along the depth of the borehole. The known method of the borehole seismic survey allows over the dynamical characteristics of the direct (downgoing) seismic waves to define the theological and absorption parameters in porous - fissured layers, which are opened by means of the exploration borehole, and in view of the essential differentiation of the oil-and-gas deposits over rheological properties the reliable information about the physico-mechanical parameters of the rocks in the vicinity of the borehole is received.

However, the above-mentioned method ignores the conditions changes at the multiple excitation of the oscillations by the near-surface sources and the influence of the specified changes on the dynamical parameters of longitudinal wave. The method also does not envisage the statistical processing of the amplitude values of the monotype time signals for the receiving of the coefficients of attenuation and energy dispersion of longitudinal wave. The ultimate aim of the known method does not allow to receive the bedded values of the oil-field parameters for the exact identification of the oil-and-gas deposits images.

The kernel of the problem which advantaged the creation of the present invention, consists in the following. The features of the existing technology of the deep borehole drilling with the considerable differentiation of bedded pressures in the rocks along depth of the borehole is demanded in order the above-mentioned drilling mud heavers will be applied under the specified conditions for the prevention of emergencies, therefore, there is the peening of the part of perspective in the oil-and-gas-bearing relation layers. By the appearance of the drilling mud in last considerable invaded zones qualitative diagnostics of the productive layers by means of the standard methods of the well logging becomes ineffective, and the time of the deposit development leads to the skip of the average-and-low-permeable oil-and-gas-bearing layers and decreases the potential productivity of the boreholes in (1.2–1.5) times.

The task, set at making the given invention, is to receive the method of wave diagnostics of the oil-and-gas deposit which by means of the seismic insonification of the vicinity of the borehole will allow over the recording of the displacement vector data in the investigated borehole by means of the three-component seismic profiling to receive the oil-field information on the values of the absorption coefficients, characterizing the type of the fluid saturation; the coefficients of fissuring, granular and fissured permeability, residual water saturation and fluid saturation of the rocks, including the layers with the considerable invaded zone of the drilling mud.

The existing problem of transition from the observable values of the parameters to their bedded values can be solved by the data special processing, introducing the corrections to the dynamical parameters of the borehole and check data, taking into account the changes of the conditions of the wave excitation and the filtrational effect of the covering thickness of the rocks for each observation point along depth of the investigated borehole.

Last allows first to calculate the dynamical parameters of the impulse responses of the layers, and then to transform their corresponding petrophysical and oil-field parameters and simultaneously provides the reception of the reliable information about the effective thickness of the productive layers and about sites of the gas-oil-water contacts, and also enables to estimate the quality of the cap rocks and to establish the presence of the tectonic dislocations of the investigated borehole of crossing.

BRIEF SUMMARY OF THE INVENTION

The problem is solved in the following way. A method of wave diagnostics of the oil-and-gas deposit which includes the excitation of the seismic waves by the near-surface sources of oscillations, the recording of the displacement vectors for the direct longitudinal and shear waves for the each observation point by means of the three-component seismic profiling along the depth of the investigated borehole and the processing of their kinematic and dynamical parameters, characterised that one near-surface source of oscillations executes in the vicinity of the borehole the longitudinal wave excitation, and their reception is carried out simultaneously in the investigated and check boreholes; after orientation in space of data of three-component observations, the monotype time signals for the compression and shear constituents of the direct longitudinal wave are extracted out of the seismic wavelets which were registered on the axial and tangential components of the displacement vector by the borehole and check devices respectively; further by means of processing the kinematic parameters of the direct longitudinal and shear waves calculate interval values of the elasticity modules (longitudinal and shear); after the decoding of the monotype time signals quantitative estimates of their significant dynamical parameters are made for the borehole and check data, and respectively for the each observation point and constituent of the direct longitudinal wave, moreover the accuracy of the obtained estimates of the dynamical parameters is monitored by means of the computer modelling of the seismic signals; then, carrying out the correction of the corresponding parameter because of the changes of the wave excitation conditions during multiple excitation of oscillations and the filtration of the seismic signals in the covering thickness of the rocks, defines the dynamical parameters of the impulse responses, values of the coefficients of dynamical viscosity (volumetric and shear) and absorption (for compression and shear constituents) of the layers, when the calibrated values of the absorption coefficients for the compression constituent are used in the capacity of the indicator for the presence estimate and the fluid-type identification, filling the pore and fissure volume in the rocks, and also values of the bedded coefficients of the effective attenuation, attenuation and energy dispersion of longitudinal wave are calculated; then, the obtained petrophysical data are converted into bedded values of the parameters of the reservoir and fluid-saturated properties of the layers with the aim of the receipt of the necessary totality of significant oil-field parameters for the identification of the oil-and-gas deposit image.

At the same time the check borehole is located on the trajectory of propagation direct longitudinal (or shear wave) between investigated borehole and the point of the oscillations excitation at the distance (20–50) m from the last. Location depth of the explosive charge (or air gun) used for the oscillations excitation in the near-surface borehole is defined out of the separation condition of the direct longitudinal wave from the satellite waves, which are formed in the time of reflection of last from free earth surface.

The recording of the displacement vectors of the direct longitudinal (or shear) wave are carried out simultaneously in the investigated and check boreholes, moreover in the investigated borehole—with the help of the three-component multi-level borehole sonde sequentially moving along the borehole depth, and in the check borehole by means of stationary located three-component one-level sonde. The detailed three-component profiling in the investigated borehole is executed with the step of the discrete observations every (2.5–5) m.

Since the monotype time signals extraction for the compression and shear constituents out of the observed experimentally seismic wavelets on the axial and tangential components of the displacements vector for the direct longitudinal wave is realized—for the compression constituent by means of deduction the seismic wavelets, observed on the axial component, with weight coefficient out of the seismic wavelets, observed on the axial component, whereas for receipt of the shear constituent—seismic wavelets, observed on the tangential component, are normed with the same weight coefficient for each observation point in the investigated and check boreholes.

The interval values calculation of the elasticity modules (of longitudinal and shear) is made by means of the coprocessing of longitudinal and shear waves velocities and the density logging data. The decoding is realized by means of the parametrical analysis of the monotype time signals for the compression and shear constituents of the direct longitudinal wave with receipt of the quantitative estimates of their significant dynamical parameters for the borehole and check data, moreover in quality of the significant dynamical parameters of the monotype time signals for the compression and shear constituents of the direct longitudinal wave makes use of the initial amplitudes, steepness exponents, attenuation coefficients, instantaneous frequencies and initial phases.

With the purpose of the receipt of dynamical parameters of the layers impulse responses for given point of the observation executes numerical correction of the dynamical parameters estimates of the monotype time signals for borehole observations by means of the utilization of the analogous parameters of signals for the check observations, and further by means of the layer-stripping method is realized the correction of revised estimates of the dynamical parameters for the given observation point by means of use the analogous parameters of the monotype time signals for the previous observation point of lengthways depth of the borehole. For qualitative indication of the presence and fluid type—oil, gas or water, filling the pore and fissured volume in the rocks, quantitative values of the bedded absorption coefficients for the compression constituent of the direct longitudinal wave are compared with the calibrated values of the above-mentioned coefficients for the oil-gas- or water-saturated rocks.

The calculation of bedded coefficients of the effective attenuation is realized by means of statistical processing of the interval values of the initial amplitudes previously corrected owing to the conditions change in the time of multiple excitation of the oscillations, and owing to the geometrical divergence of the wavefront, further is defined the bedded attenuation coefficients by means of the statistical processing of the interval values of the longitudinal modules of the elasticity, and also is defined bedded absorption coefficients, for that the absorption data average out statistically on depths intervals of the layers, accordingly for the compression and shear constituents of the direct longitudinal wave. For the calculation of the oil-field parameters collection of the reservoirs, such as bedded values of the coefficients of porosity, granular and fissured permeabilities, residual water saturation and fluid saturation, are used bedded values of the coefficients of volumetric and shear dynamical viscosity jointly with values of the temperatures, diffusion constants, meanderingness of pore channels coefficients and others.

Under the given invention all the significant parameters of the reservoir and fluid-saturated properties of the rocks in the radius of (50–100) m for the vicinity of the borehole are received, whereas the above-mentioned parameters are not defined with the required completeness by the standard complex of the well logging methods, which give only the restricted information about the vicinity of the borehole in the radius which is not exceeding (0.5–2.5) m.

With the help of the given invention the reliable information about the quantitative parameters of the oil-and-gas-bearing layers can be received, irrespective of the difficulties of the drilling and bedding conditions, the lithological content and the thermodynamical state of the oil-and-gas deposits, that finally reduces the cost price of the drilling expenses and owing to the cutting of the common number of the boreholes maintains the ecological situation in the region of exploration.

BRIEF DESCRIPTION OF THE SEVERAL VIEWS OF THE DRAWINGS

For the more complete understanding of the main point of the given invention and its advantages the references to the description are made, which is considered here together with the accompanying figures where the following is represented.

DETAILED DESCRIPTION OF THE INVENTION

Figure 1:
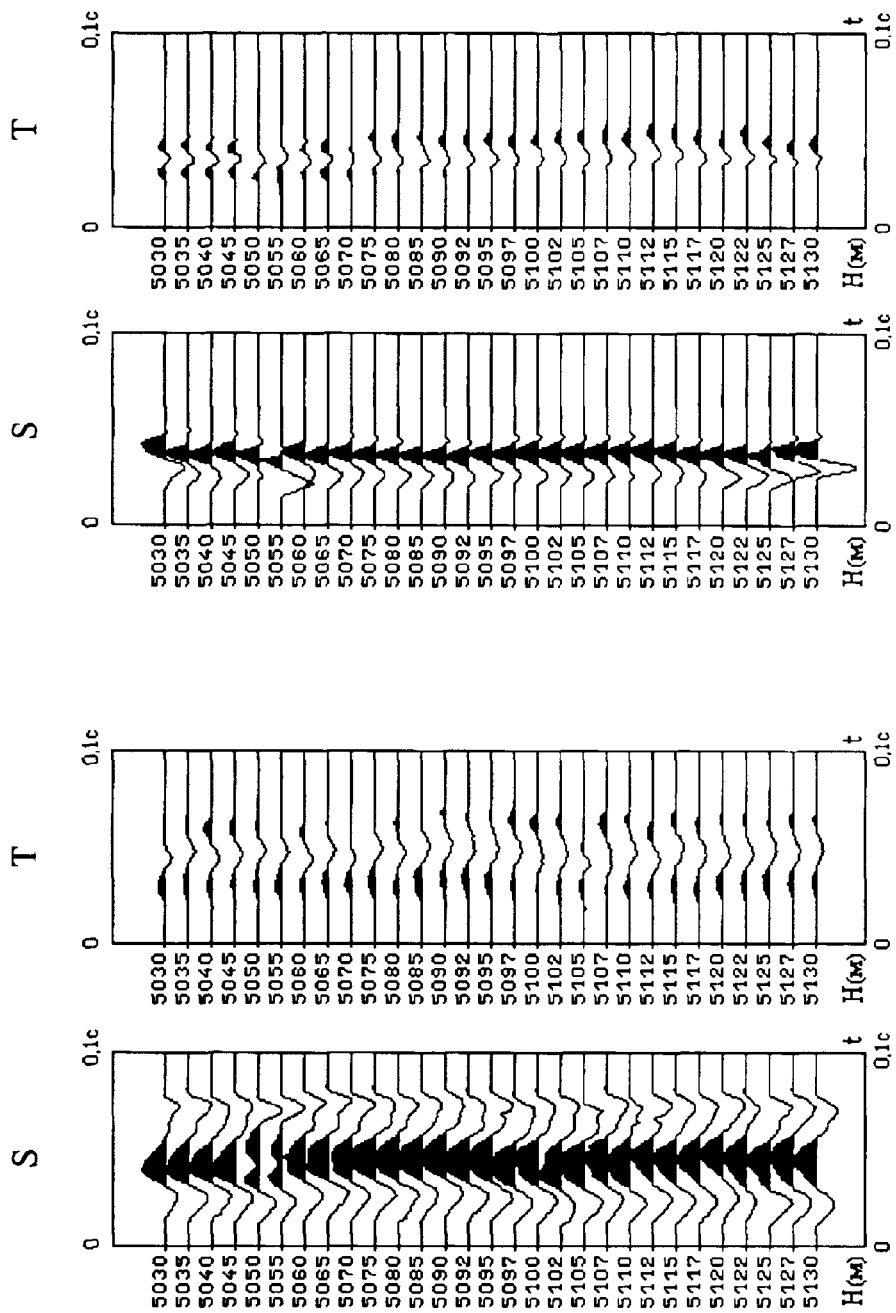
FIG. 1—the seismograms, corrected across beyond the first arrivals, of the compression (S) and shear (T) constituents of the direct longitudinal wave for borehole (A) and check (B) observations (the borehole of the Lopushna-13).
Figure 2:
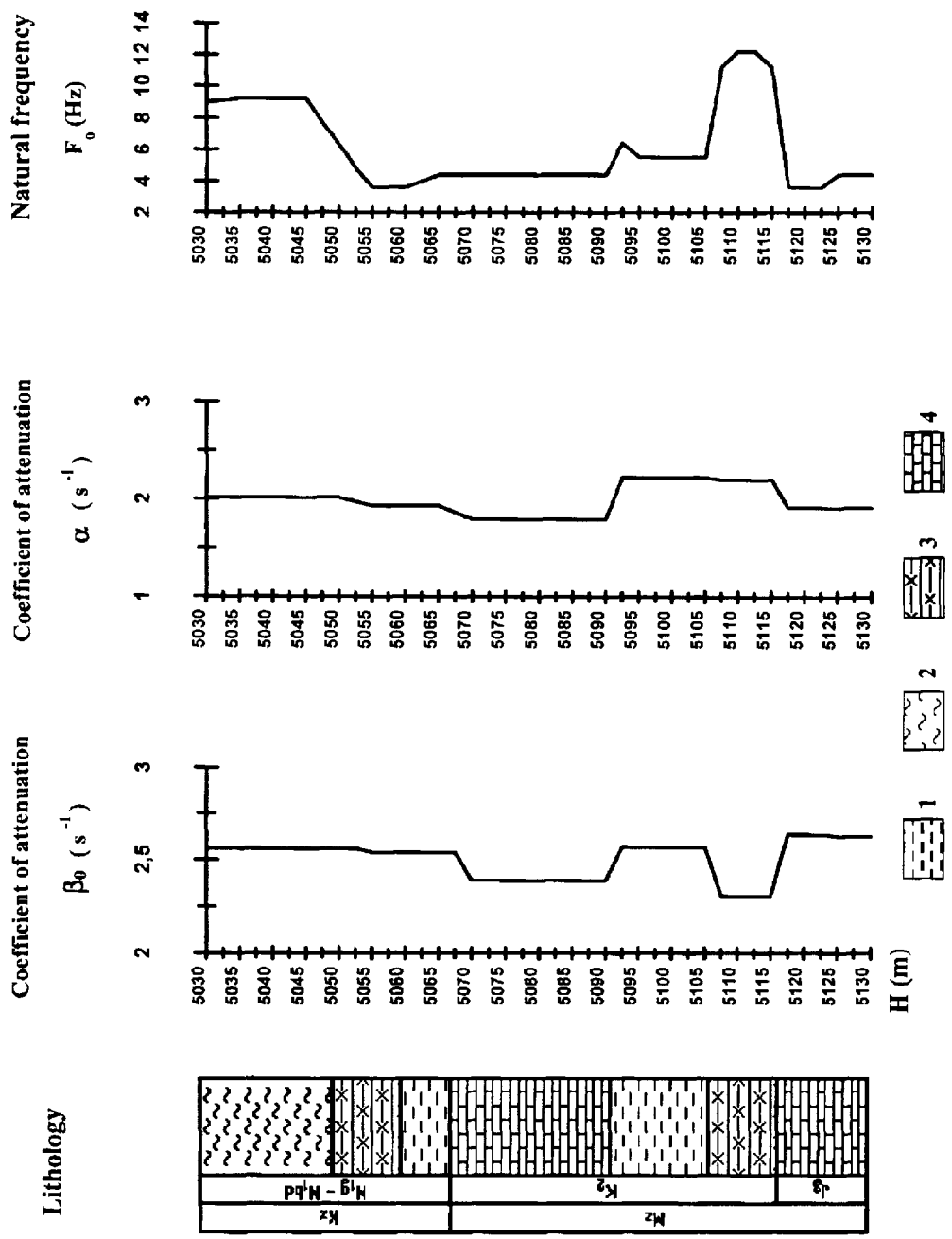
FIG. 2—the dynamical parameters of the impulse responses of the rocks for the borehole of the Lopushna-13: the attenuation coefficients of compression ($\beta_o$) and coefficients of shear attenuation ($\alpha$); the frequencies of natural oscillations ($F_o$), which are compared with the lithology.

The diagnostics of the dynamical, Theological, absorbing, reservoir and fluid-saturated properties for the rocks in the vicinity of the borehole is based on the combined deformation model of the vertically—inhomogeneous viscoelastic isotropic solid medium for the isothermal case, proposed by the author [Briginevich V. A. 1991. The combined model of deformation and the conditions of longitudinal wave propagation in a viscoelastic solid. Geophys. Journal. 10(3), 388–405]. The generalization of the above-mentioned deformation model of the viscoelastic solid medium for case of the vertically-inhomogeneous changing of its parameters over the depth are discussed below.

According to the combined deformation model of the vertically-inhomogeneous viscoelastic solid medium such macroscopic parameters as the displacements, stresses, modules of elasticity, the coefficients of dynamical viscosity and others can be measured. Moreover above-mentioned macroscopic parameters directly depend on such microscopical parameters of the real solid medium as microstructure of the matrix material, the sizes of the micropores, the density of microfissures and their fluid saturation, when their presence is appeared by means of total response of the last to impulse external action in the form of the average statistical values of porosity, fissuring, permeability and fluid saturation.

The combined deformation model of the vertically-inhomogeneous viscoelastic solid medium is determined by the equations, which for the rectangular coordinate system (x,y,z) characterize the following stressed and deformed state: $\sigma_z > \sigma_x = \sigma_y$; $\sigma_{xx} = \sigma_{xy} = \sigma_{zx} = 0$; $\epsilon_x \neq 0$; $\epsilon_x = \epsilon_y = 0$, where $\sigma_{x,y,z}$—normal stresses; $\sigma_{xz}$, $\sigma_{xy}$, $\sigma_{zx}$—tangential stresses; $\epsilon_{x,y,z}$—linear deformations, which arise in the solid medium during the propagation of plane longitudinal wave, moreover the equations are represented for the components of the stress vector in the operator form:

$$\sigma_z = \left[\left(\lambda + \lambda^* \frac{\partial}{\partial t}\right) + 2\mu \frac{\partial}{\partial t} \Big/ \left(\frac{\mu}{\eta} + \frac{\partial}{\partial t}\right)\right] \epsilon_z, \quad (1)$$

$$\sigma_{x,y} = \left(\lambda + \lambda^* \frac{\partial}{\partial t}\right) \epsilon_z, \quad (2)$$

where $\lambda = \lambda(z)$, $\mu = \mu(z)$—the compression and shear moduli (Lame's coefficients); $\lambda^* = \lambda^*(z)$, $\eta = \eta(z)$—the coefficients of the volumetric and shear dynamical viscosity, respectively. According to the form of the state equations (1,2), which satisfy the movement equation:

$$\frac{\partial \sigma_i}{\partial x_i} = \rho \frac{\partial^2 U_i}{\partial t^2},$$

where $\rho = \rho(z)$—the density; i=(x,y,z) we receive the homogeneous wave equations for the displacements components of the plane longitudinal wave propagating in the direction of the axis oz:

$$\left\{\beta \frac{\partial}{\partial t}\left(\frac{\partial^2}{\partial t^2} + 2\alpha \frac{\partial}{\partial t}\right) \Big/ \left[\frac{\partial^2}{\partial t^2} + (2\alpha + \beta)\frac{\partial}{\partial t} + \omega_0^2\right]\right\} U_z = \quad (3)$$

$$V_p^2 \left[\frac{\partial^2}{\partial z^2} + \frac{\partial \ln(\lambda + 2\mu)}{\partial z} \cdot \frac{\partial}{\partial z}\right] \cdot U_z,$$

$$\left[\rho \frac{\partial^2}{\partial t^2} + \lambda^* \frac{\partial^2}{\partial z^2 \cdot \partial t} + \lambda \frac{\partial^2}{\partial z^2}\right] \cdot U_{x,y} = 0, \quad (4)$$

where $U_{x,y,z} = U_{x,y,z}(z,t)$—the components of the displacements vector for rectangular axes(x,y,z); $V_p = V_p(z) = [(\lambda+2\mu)/\rho]^{1/2}$—the local velocity of the longitudinal wave; $\omega_o = (\lambda \mu / \lambda \eta)^{1/2}$—the angular frequency of natural oscillations; $\alpha = \mu/2\eta$—the shear coefficient of attenuation; $\beta = (\lambda+2\mu)/\lambda^*$—the volumetric coefficient of attenuation.

Within the correctly formulated nonstacionary mixed problem on radiation in case of the inhomogeneous initial and homogeneous boundary conditions of the impedance type which are executed on the plane wavefront of the direct longitudinal wave, when t>0, z>0, the solution of the equations (3,4) or the impulse responses of the deformation for the above-mentioned medium, using the Fourier method, have been received for the displacements component in the shape:

$$\begin{cases} U_z(z,t) = \frac{A_0}{(\lambda+2\mu)^{\frac{1}{2}}} \left[\frac{1}{\beta_0} \cdot e^{-\beta_0 t} - B_0 e^{-\alpha t} \sin(\omega t + \varphi_0)(5)\right] \cdot \exp(i\bar{k}z), \\ U_{x,y}(z,t) = -A_0 \cdot B_0 e^{-\alpha t} \cdot \sin(\omega t + \varphi_0) \cdot \exp(-\bar{k}_\lambda z), \quad (6) \end{cases}$$

where $A_o$=const; $\omega = (\omega_o^2 - \alpha^2)^{1/2}$—the angular frequency of attenuation oscillations; $\beta_o = \omega_o^2/\beta$—the coefficient of volumetric attenuation; $\beta_o = (\alpha^2 + \omega^2)^{1/2}/\alpha\omega$—the amplitudes; $\varnothing_o = \text{arctg}(\omega/\alpha)$—the initial phase;

$$\bar{k} = \bar{k}(z) = \int_0^z \left[k_p^2 - (\lambda+2\mu)^{-\frac{1}{2}} \cdot \frac{d^2}{dz^2}(\lambda+2\mu)^{\frac{1}{2}}\right]^{\frac{1}{2}} dz;$$

$k_p = k_p(z) = \omega_o/V_p$—the local wavenumber;

$$\bar{k}_\lambda = \int_0^z k_\lambda \, dz; \quad k_\lambda = k_\lambda(z) = \omega_o/V_\lambda$$

—the absorption coefficient; $V_\lambda = V_\lambda(z) = (\lambda/\rho p)^{1/2}$; i—the imaginary unit.

The above-mentioned solution of a direct problem allows to predict the superposition of two monotype time signals in the direction of the propagation of the direct plane longitudinal wave for each point of the vertically-inhomogeneous viscoelastic solid medium. The presence of the dual impulse response during the longitudinal wave propagation is defined by the conditions of the stress-deformed state of the liquid-porous (for compression constituent) and fracture-brittle (for shear constituent) elements of the dynamically deformable solid medium.

Therefore, the monotype time signals which are excited in the continuous solid medium by the plane longitudinal wave will consist of two damped processes differing by the polarities, initial amplitudes, attenuation coefficients, instantaneous frequencies and initial phases, and only one of these processes can be clearly observed on the shear components of the displacement vector. Really, from the experimental data of the VSP polarization method is known, that the direct longitudinal wave propagating in the stratified solid medium is polarized linearly for the first and is nonlinearly for the subsequent phases of the seismic wavelets (Galperin E. I. 1984. Polarization method of seismic prospecting. D. Reidel Publications Co).

It is provided that on the plane wavefront of the longitudinal wave propagating in the direction of the axis oz, the following boundary coditions of the stationary type for the component $U_z(z,t)$ are carried out:

$$\left( \frac{d^2}{dz^2} + \frac{d\ln(\lambda+2\mu)}{dz} \frac{d}{dz} + k_P^2 \right) U_z(z) \bigg|_{z \le 0} = 0,$$

the equation (3) is converted to the form:

$$\left[ \beta \frac{\partial}{\partial t} - V_P^2 \left( \frac{\partial^2}{\partial z^2} + \frac{\partial \ln(\lambda+2\mu)}{\partial z} \frac{\partial}{\partial z} \right) \right] \left[ \frac{\partial^2}{\partial t^2} + 2\alpha \frac{\partial}{\partial t} - V_P^2 \left( \frac{\partial^2}{\partial z^2} + \frac{\partial \ln(\lambda+2\mu)}{\partial z} \frac{\partial}{\partial z} \right) \right] \cdot U_z(z,t) = 0.$$

From this equation according to the Bodgia theorem we received:

$$\left[ \beta \frac{\partial}{\partial t} - V_P^2 \left( \frac{\partial^2}{\partial z^2} + \frac{\partial \ln(\lambda+2\mu)}{\partial z} \frac{\partial}{\partial z} \right) \right] U'_z(z,t) = 0; \quad (7)$$

$$\left[ \frac{\partial^2}{\partial t^2} + 2\alpha \frac{\partial}{\partial t} - V_P^2 \left( \frac{\partial^2}{\partial z^2} + \frac{\partial \ln(\lambda+2\mu)}{\partial z} \frac{\partial}{\partial z} \right) \right] U''_z(z,t) = 0, \quad (8)$$

where $U_z(z,t) = U'_z(z,t) + U''_z(z,t)$.

If the boundary conditions are executed, each of the equations (7), (8) will fulfil the sample solutions for the harmonic components: $U_z^{',''}(z,t) = e^{i\overline{\omega}_1} \exp[i\overline{k}(\overline{\omega})z]$ (9), where the characteristic angular frequency $\overline{\omega}$ will be the independent variable; $\overline{k}(\overline{\omega})$—the complex wavenumber, $k(\overline{\omega}) = \overline{\omega}/V(\overline{\omega})$—the real wavenumber, $\alpha(\overline{\omega})$—the attenuation coefficient; $V(\overline{\omega})$—the propagation velocities of the harmonic components. Taking into account the second approximation of the VKBD method ($k(\overline{\omega})=k_p$), the solutions (9) will be true if: $V(\overline{\omega})=V_p\overline{\omega}/\omega_o$, $\alpha^{'',''}(\overline{\omega})=\alpha^{'',''}(\overline{\omega})+\alpha^{'','''}$, where $V(\overline{\omega}), \alpha^{'',''}(\overline{\omega})$—the propagation velocity and the total attenuation coefficients, respectively; $\alpha'(\overline{\omega})=\beta\overline{\omega}/2V_p\omega_o$ and $\alpha''(\overline{\omega})=\alpha\overline{\omega}/V_p\omega_o$—the absorption coefficients, characterizing the theological-properties of the solid medium; $\overline{\alpha}^{'',''}=d\ln(\lambda+2\mu)/dz$—the attenuation coefficient, characterizing gradient properties of the elastic parameters in the solid medium for $U'_z(z,t)$ and $U''_z(z,t)$, respectively.

The description of the propagation of the direct plane longitudinal wave in each observation point of the stratified vertically-inhomogeneous viscoelastic solid medium is possible while using the convolutional model and approximation of the seismic wavelets by means of the analytical function of Berlage representing the description of the wide class of the monotype time signals.

Hence the impulse responses of the above-mentioned deformation medium for the components of the displacement vector may be offered in the form:

$$\begin{cases} \overline{u}_{x,y}(z,t) = -A''_l t^{\overline{p}''} \exp(-\overline{\alpha}t)\sin(\overline{\omega}''t - \overline{\varphi}''_0)\exp(-\overline{k}_\lambda z); \\ \overline{u}_z(z,t) = \left[ A'_l t^{\overline{p}'} \exp(-\overline{\beta}_0 t)\sin(\overline{\omega}'t - \overline{\varphi}'_0) - \right. \\ \left. A''_l t^{\overline{p}''} \exp(-\overline{\alpha}t)\sin(\overline{\omega}''t - \overline{\varphi}''_0) \right] \exp(i\overline{k}z), \end{cases}$$

where $\overline{u}_{x,y,z}(z,t)$—the displacements for the (x,y,z)—components; $A_1', A_1''$—the amplitudes dependent on the coefficients of the wave transmission in the layers; $\overline{p}'.''$—the steepness exponents; $\overline{\beta}_0, \overline{\alpha}$—the attenuation coefficients; $\overline{\omega}^{',''}$—the angular frequencies; $\overline{\varphi}_0^{',''}$—the initial phases for the compression (') and shear (") constituents, respectively.

The physical observations of the three-component VSP data for the recording of the displacement vector are realized in the vertical cylindrical boreholes which are located in the stratified vertically-inhomogeneous viscoelastic solid medium. According to the classical mechanics of the continuous medium the borehole is the concentrator of stresses and deformations in the above-mentioned medium. It is known, that in the presence of orthogonality of the axis oz the boreholes concerning the wavefront of the plane longitudinal wave, the wavelength considerably exceeds diameter of the borehole 2a, where a—the radius of the borehole. Therefore, for the wavefield components and observations on the wall of the cylindrical borehole the author has received the special solution of the problem, where in the calculation is based on the following.

If the vicinity of the borehole is considered in the cylindrical coordinate system with the ordinate oz, directional along an axis of the borehole, then the boundary conditions on the borehole wall for the stresses are usually set in the form: $\sigma_r|_{r=\alpha}=0$; $\sigma_\theta|_{r=\alpha}=2\sigma_\theta$; $\sigma_z|_{r=\alpha}=\sigma_z$, where $\sigma_r, \sigma_\theta, \sigma_x$—the normal stresses for the radial, tangential and axial components. According to the received solution the components of the displacement vector which are formed by the direct plane longitudinal wave on the borehole wall, propagating in the vicinity of the borehole in the direction of the axis oz, are:

$$\begin{cases} u_r(z,t) = 0; \\ u_\theta(z,t) = -\sqrt{2}\, \tilde{A}''_l t^{\tilde{p}''} \exp(-\tilde{\alpha}t)\sin(\tilde{\omega}''t - \tilde{\varphi}''_0)\exp(-\overline{k}_\lambda z); \\ u_z(z,t) = \left[ \tilde{A}'_l t^{\tilde{p}'} \exp(-\tilde{\beta}_0 t)\sin(\tilde{\omega}'t - \tilde{\varphi}'_0) - \right. \\ \left. \tilde{A}''_l t^{\tilde{p}''} \exp(-\tilde{\alpha}t)\sin(\tilde{\omega}''t - \tilde{\varphi}''_0) \right] \exp(i\overline{k}z), \end{cases}$$

where $u_{r,\theta,z}(z,t)$—the displacements components in the cylindrical coordinate system $(r,\theta,z)$; the index (~) designates the estimated parameters during processing.

Then at excitation of the direct longitudinal wave in the vicinity of the borehole and during the displacements observations on the borehole wall the superposition of the monotype time signals on the axial component is defined: $u_z(z,t)|_{z=H}=u_z(t)=u_z'(t)+u_z''(t)$, whereas on the tangential component: $u_\theta(z,t)|_{z=H}=u_\theta(t)$ only one monotype time signal is observed: $u_T(t)=u''_z(t)=u_\theta(t)/\sqrt{2}$. Hence, it follows: $u_s(t)=u_z(t)-u_\theta(t)/\sqrt{2}$, where $u_z(t), u_\theta(t)$—the displacements observed on the axial and tangential components; $u_s(t), u_T(t)$—the displacements characterizing the monotype time signals for the compression (S) and shear (T) constituents of the direct longitudinal wave, respectively.

The process of the invention utilization includes: the observations of the wavefield in investigated and check boreholes with necessary fullness (three-component observations for recording the displacement vector) and with necessary detail (the dense step for observation points during the borehole profiling); the digital recording of seismic waves at wide-band dynamic and frequency ranges; the data processing of three-component observations with the purpose of their transformation from the view of the data, specified by observation system (the subsurface source of the for wave excitation, while geophones are in the borehole), to the aspect of data which represent values of the dynamical parameters of the impulse responses of the rock layers, and the subsequent geologic interpretation by means of the rheological data converting to the values of the oil-field parameters of the rocks.

The procedures of the borehole observations envisage the recording of the three-component data in two boreholes simultaneously, moreover one of them—the investigated borehole where measurements are realized by means of profiling of the borehole depths intervals with the three-component multi-level borehole sonde, and another—the check borehole in which the three-component one-level sonde is located stationary.

For the oscillation excitation one near-surface source (the shotpoint) is used, moreover the distance of the last from the investigated borehole does not exceed (50–100) m. The oscillation excitation is realized by the known method, for example, by means of the location in the near-surface borehole of the explosive charge (or the air gun) at the optimum depth which guarantees the reception of the maximal energy and the simple shape of the seismic wavelets of the direct longitudinal wave.

The optimum depth of the location of the explosive charge (or the air gun) is determined by means of the execution of the obligatory condition of the separation of the direct longitudinal wave from the satellite waves, which are shaped in the time of reflection from the free surface. Simultaneously the force of the impulsive action at the excitation of oscillations, determined by the weight of the charge (or the air gun power) and the seismogeological conditions of its location, should guarantee the reception of such energy of the direct longitudinal wave in the investigated borehole in order to enable the seismogram of the tangential component for the borehole three-component sonde to distinguish the useful signal in the background of the noise (the signal-to-noise ratio must exceed 1).

For the registration of the conditions change of the nonsingle excitation of oscillations during the production of works on the investigated borehole the check borehole is used, located close to the area of the excitation and on the trajectory of the direct waves between the investigated borehole and the shotpoint at the distance of (20–50) m from last. The three-component one-level sonde is dipped in the check borehole to the depth below the depths of the location of the explosive charge (or the air gun).

The borehole investigations are conducted by means of the standard equipment with the digital recording of the seismic signals, which implements on the open channel with the sampling interval of 0.5 ms and in the time of absence of the amplitude adjustments. The investigations are conducted in the borehole at the perspective in the oil-and-gas-bearing relation interval of depths (length 300–500 m) by means of the detailed three-component profiling last with the step of the discretic observations every (2.5–5) m.

The method of the data processing of the borehole observations is based on the solution of the inverse problem for the case of normal plane waves incidence. The method envisages the data processing of the three-component observations which preliminarily are oriented in the space, and the extraction of the monotype time signals for the compression and shear constituents from the seismic wavelets which are observed experimentally on the axial and tangential components of the displacement vector of the direct longitudinal wave for the borehole and check devices. The procedures of the digital extraction of the constituents and respective monotype time signals were considered earlier.

On the first stage of processing by means of the parametric analysis of the seismic traces (Taner M. T., Koehler F. and Sheriff R. E. 1979. Complex seismic trace analysis. *Geophysics*, 44, 1041–1063.) the monotype time signals are decoded according to the compression and shear constituents of the longitudinal wave with the further receiving of the quantitative estimates of their significant dynamical parameters such as the initial amplitudes, steepness exponents, attenuation coefficients, instantaneous frequencies and initial phases.

The parametric analysis of the monotype time signals jointly with the procedure of the determination of the numerical estimates of their dynamical parameters is performed with the use of the approximation of the seismic wavelets by the analytic function of Berlage which allows to represent adequately the typical monotype time signals by means of the totality of only five significant dynamical parameters:

$$U_{S,T}(z,t) = \tilde{A}_o^{\cdot,\prime\prime} t^{\tilde{p}^{\cdot,\prime\prime}} \exp[-(\beta_o, \alpha)t] \sin(2\pi \tilde{F}^{\cdot,\prime\prime} l + \tilde{\phi}_o^{\cdot,\prime\prime}),$$

where the estimated parameters: $\tilde{A}_o^{\cdot,\prime\prime}$—the initial amplitudes; $\tilde{p}^{\cdot,\prime\prime}$—the steepness exponent; $\beta_o$, $\alpha$—the attenuation coefficients; $\tilde{F}^{\cdot,\prime\prime}$—the instantaneous frequencies and $\phi_o^{\cdot,\prime\prime}$—the initial phases of the monotype time signals.

In the invention the opportunity of receiving of the most precise values of the parameter is taken into account, since each of the dynamical parameters at measuring its value will have biased estimates. The last is achieved by means of the computer modelling of the monotype time signals, according to which the received quantitative estimated parameters by means of the model of the synthetic signals are compared visually to the observed monotype-time signal and the next are corrected with the application of the optimal deciding rules.

It is important, that the prognosis of the shape of the monotype time signals ensures the receiving of the estimates of their dynamical parameters for each observation point of the lengthways depth of the borehole. The estimated parameters can be numerically corrected for converting them from the observable values into the bedded values type. For this purpose, using the borehole and check data of the observation for the respective constituent of the direct longitudinal wave, they separately calculate the estimated dynamical parameters of the monotype time signals, and after the improvement of the received values of the estimates by means of the computer modelling execute the correction of their values according to the algorithms, offered by the author, by the recalculation of the parameters, characterizing the impulse responses of the rock layers.

In view of the postulated linearity of conditions for displacements (in the time of the seismic waves propagation), receiving and recording devices, problem of the dynamical parameters acquisition of the monotype time signals can be considered within the limits theory of the linear filtration, when the seismic channel has the impulse and frequency characteristics. For exception of the distorting effect owing to the activity of the recording channel and for the exception of the conditions change of the wave excitation at the beginning the numerical correction of the estimated dynamical parameters $(\beta_o, \alpha; \omega'')$ for the monotype time signals of the borehole observations is implemented by means of the use of the analogical parameters out of the check observation data according to the dependencies:

$$(\beta_o, \alpha)_{bor} = 2(\beta_o, \alpha)_{bor} - (\beta_o, \alpha)_{check}; \quad \omega''_{bor} = 2\tilde{\omega}''_{bor} - \omega''_{check},$$

where $(\beta_o, \alpha; \omega'')_{bor.}$ and $(\beta_o, \alpha; \omega'')_{check}$—the estimated values of the dynamical parameters for the borehole and check data and the respective observation point. Then the correction of the revised estimates of the dynamical parameters is implemented by means of the layer-stripping method $(\beta_o, \alpha; \omega'')_{bor}$, that allows to delete the distortions of the parameters for the borehole data, caused by the filtrational effect of the covering thickness of the rocks, and also to convert the last parameters into the respective parameters of the layers impulse responses.

The recalculation of the revised estimates in the interval values of the dynamical parameters of the impulse response for the separate layer is carried out according to the following formulas:

$$(\beta_o,\alpha)_{layer}=2p^{\cdot\cdot\cdot}{}_j(\beta_o,\alpha)_j-(\beta_o,\alpha)_{j-1};\ \omega"_{layer}=2p^{\cdot\cdot\cdot}{}_j\omega"_{layer}=2p^{\cdot\cdot\cdot}{}_j\omega"_j-\omega"_{j-1},$$

where $(\beta_o,\alpha;p^{\cdot\cdot\cdot},\omega")_j$—the values of the revised estimates of the dynamical parameters for the j-observation point; $(\beta_o,\alpha;p^{\cdot\cdot\cdot},\omega")_{j-1}$—the revised estimates values of the dynamical parameters for the (j−1)—observation point lengthways depth of the borehole; $(\beta_o,\alpha,\omega")_{layer}$—the interval values of the dynamical parameters of the impulse response of the layer.

The joint use of the kinematic parameters of longitudinal and shear waves, and also the density logging data on the second stage of the processing allows to define interval values of such elastic modules as longitudinal $-(\lambda+2\mu)=\rho V_p^2$ and shear $-\mu=\rho V_z^2$, where $\lambda,\mu$—Lame's coefficients; $V_{p,s}$—the velocities of longitudinal and shear waves and $\rho$—the density. Using the values of the dynamical parameters of the impulse responses and the elastic modules for the rock layers, the values of such theological parameters as the coefficients of the dynamical viscosity: $\lambda=(\lambda+2\mu)/\beta$ (for the volumetric viscosity) and $\eta=\mu/2\alpha$ (for the shear viscosity) are calculated.

Simultaneously the absorption coefficients, linearly-dependent from the characteristic angular frequency $(\bar\omega)$, are calculated for each observation point lengthways depth of the borehole according to formulas: $\alpha'(\bar\omega)=\beta\bar\omega/2V_p\omega_o$; $\alpha"(\bar\omega)=\alpha\bar\omega/V_p\omega_o$, and the quality factors (Q-factors) are calculated according to: $Q'(\bar\omega)=\omega_o^2/\beta\bar\omega;Q"(\bar\omega)=\omega_o^2/2\alpha\bar\omega$, respectively for the compression and shear constituents, where $\bar\omega \leq \omega_o$—the characteristic angular frequency; $\omega_o=2\pi F_o$—the angular frequency of natural oscillations; $\beta=\omega_o^2/\beta_o$—the volumetric attenuation coefficient. In addition distinctiveness of the calculation method of the absorption coefficients $[\alpha^{\cdot"}(\bar\omega)]$ in the given invention is utilization for their receipt only dynamical parameters $(\beta,\alpha,\omega_o)$ and the velocities values $(V_p)$ of longitudinal wave.

The author has established experimentally that the bedded values of the absorption coefficient $[\alpha'(\bar\omega)]$ for the compression constituent of the longitudinal wave can serve as the indicator of the hydrocarbon presence in the rocks what is caused their properties such as the porosity, fracturing, permeability and fluid saturation (Brygynevych V. A. 1997. REOKONA seismic technology studies reservoir and fluid—saturated properties of the rocks in the vicinity of borehole. 59th EAGE Conference, Geneva, Switzerland, Extended Abstracts, P075). Therefore, the bedded values of the absorption coefficient $[\alpha'(\bar\omega)]$ for the compression constituent of the longitudinal wave are used to receive the quality estimates of the fluid-type identification, filling the pore and fissure volume in the rocks. For this purpose quantitative values of the obtained absorption coefficients for the compression constituent, reduced to bedded conditions, are compared with the calibrated values of the above-mentioned coefficients for the oil-gas-or-water-saturated rocks.

In this connection the calibration conditions are offered: $\alpha'_w(\bar\omega)<\alpha'_o(\bar\omega)<\alpha'_g(\bar\omega)$, where the quantitative values of the absorption coefficient are compared: for water —$\alpha'_w(\bar\omega)$, oil—$\alpha'_o(\bar\omega)$ and gas—$\alpha'_g(\bar\omega)$, respectively. The calibrated value of the absorption coefficient for the compression constituents depends from the characteristic frequency $(\bar\omega)$. Thus, for the frequency $\bar\omega=2\pi 20(Hz)$ the numerical values of the absorption coefficient changes within limits: for water —$\alpha'(\bar\omega)=(1-4)*10^{-3}$ m$^{-1}$, for oil —$\alpha'_o(\bar\omega)=(5-7)*10^{-3}$ m$^{-1}$ and for gas—$\alpha'_g(\bar\omega)=(8-10)*10^{-3}$ m$^{-1}$.

However, the calibrated values of the absorption coefficient $[\alpha'(\bar\omega)]$ for the shear constituent of the longitudinal wave are changed in the reverse order: $\alpha"_w(\bar\omega)>\alpha"_o(\bar\omega)>\alpha"_g(\bar\omega)$, where the absorption coefficients are: for water—$\alpha"_w(\bar\omega)$, oil—$\alpha"_o(\bar\omega)$ and gas—$\alpha"_g(\bar\omega)$, respectively. It has been determined by the changes of the fluid type, filling the pore and fissure volume in the rocks, the absorption coefficients $[\bar\omega^{\cdot"}(\bar\omega)]$ for the compression and shear constituents are changed in the opposite directions.

The given invention envisages an opportunity of the precision increase of receipt of the interval initial amplitudes estimates for seismic wavelets of the direct longitudinal wave by means of: the monotype time signals utilizations; presence of the initial amplitudes estimates $(\tilde A_o^{\cdot"})$; the corrections of the above-mentioned amplitudes estimates for decrease of their scatter owing to the change of the conditions in the time of multiple excitation of the oscillations and their subsequent normalization for the compensation of geometrical divergence of the wavefront (owing to difference of last from plane).

On the third stage of processing after correction factors calculation out of the check observations data and the subsequent correction of the estimates values of the initial amplitudes for the borehole observations data is carried out normalization of revised amplitudes for the compensation of geometrical divergence of the wavefront respectively for the compression and shear constituents of the direct longitudinal wave and the corresponding observation point.

Then for the previously separated layers (according to the lithological data) the statistical processing of the interval values of the initial amplitudes $(A_o^{\cdot"})$, the longitudinal modules of the elasticity $(\lambda+2\mu)$ and the absorption coefficients $[\alpha^{\cdot"}(\bar\omega)]$ is implemented.

Further, according to the revised and normalized values of the initial amplitudes for the each observation point lengthways depth of the borehole and for respective constituent of longitudinal wave the effective attenuations coefficient for the j-layer is calculated: $\alpha^{\cdot"}{}_{eff.att.}=(\ln A_o^{\cdot"}{}_{j2}-\ln A_o^{\cdot"}{}_{j1})/\Delta H_j$, where $A_o^{\cdot"}{}_{j1}, A_o^{\cdot"}{}_{j2}$—the values of amplitudes on the upper $(j_1)$ and lower $(j_2)$ boundaries of the j-layer with the thickness $(\Delta H_j)$, which are defined statistically by means of the least squares method using the declination of the changes diagrams of the natural logarithm of the initial amplitudes $(\ln A_o^{\cdot"}{}_j)$ for the estimated depths interval.

The total attenuation coefficients for the direct longitudinal wave according to the combined deformation model of the vertically-inhomogeneous viscoelastic solid medium are follows: $\alpha^{\cdot"}(\bar\omega)=\bar\alpha^{\cdot"}(\bar\omega)$, where $\bar\alpha^{\cdot"}$—the attenuation coefficients, characterizing gradient properties of the elastic parameters; $\alpha^{\cdot"}(\bar\omega)$—the absorption coefficients, characterizing rheological properties of the rock layers for the compression and shear constituents, respectively.

The real solid medium usually is thin-layered which at the definite assumption for the separate thick layer can be regarded as the gradient (or vertically-inhomogeneous) medium. Then the coefficient of attenuation $[\alpha^{\cdot"}(\bar\omega)]$, characterizing the effects of energy dispersion in thin-layered beds, can be calculated statistically by means of the least squares method according to: $\bar\alpha^{\cdot"}=[\ln(\lambda+2\mu)_{j2}-\ln(\lambda+2\mu)_{j1}]/\Delta H_j$, where $(\lambda+2\mu)$—the values of the longitudinal module of the elasticity on the upper $(j_1)$ and lower $(j_2)$ boundaries of the j-layer with the thickness $(\Delta H_j)$.

Simultaneously for receipt of bedded coefficients of the absorption $[\alpha^{\cdot"}(\bar\omega)]$, the interval values of the absorption coefficients, reduced earlier to bedded conditions, statistically average out by the least squares method on the depths intervals of layers respectively for the compression and shear constituents of the direct longitudinal wave.

As the calculation of the attenuation estimates ($\overline{\alpha'}'$) and the absorption estimates [$\alpha'''(\overline{\omega})$] is performed, using the independent data, that becomes possible owing to the numeral definition of the coefficient, characterizing scattering of the longitudinal wave on the local intrastratal inhomogeneities according to the expression: $\alpha'''_{disp.} = \alpha'''_{eff.att.} - [\overline{\alpha'}'' + \alpha'''(\omega)]$, where $\alpha'''_{disp.}$ —the dispersion coefficient on the local inhomogeneities for the j-layer with the thickness ($\Delta H_j$). The estimated coefficient of dispersion ($\alpha'''_{disp.}$) are indicators of the stressed state of the separated layers and allow to obtain the additional information, for example, about the zones with the anomalous bedded pressures.

The interpretating stage envisages the choice of the necessary totality of the measured oil-field parameters which with the sufficient completeness characterizes the reservoir and fluid-saturated properties of the deposit, moreover their information density guarantee the exact identification of the images of the oil-and-gas deposits.

The totality of the significant oil-field parameters, including the coefficients of porosity ($\Phi$), the linear density of fractures ($L_{d.f.}$), granular ($K_g$) and fissured ($K_f$) permeabilities, residual water saturation ($k'''_{r.w.}$) and fluid saturation ($k'''_{f.s.}$), quite unequivocally characterizes the capacitative, filtrational and fluid-saturated properties of the oil-and-gas-bearing layers formative the oil-and-gas deposit, moreover the above-mentioned parameters can be used as the indicators for the identification of the oil-and-gas deposit image. For the transformation of the petrophysical parameters to the form of the oil-field geology data-attributes of recognizable object the author offers the functional relationship which are taking into account the thermodynamical conditions of the rocks layers.

For the model of the pore-containing rock (or liquid-porous element of the deformable solid medium) granular permeability of the rock depends on the values of the average radius of the pore capillaries $R_o$, which can be calculated, as follows: $R_o = 2\Omega D_o \lambda'/kT$, where $\Omega$—the atomic volume; $D_o$—the diffusion constant of atoms; k—Boltzmann's constant; T—Kelvin's temperature (°K). According to Pauzel's and Darsy's laws the granular permeability is defined following the formula: $K_g = \Phi_g R_o^2/8P^2$, where P—the meanderingness of pore channels coefficient and $\Phi_g$—the granular porosity coefficient.

The granular porosity coefficient for the rock can be calculated as: $\Phi_g = (\rho_s - \rho p)/(\rho_s - \rho_1)$, where $\rho, \rho_s, \rho_1$, are the common, solid and liquid phases of density, moreover the parameters $\rho, \rho_s, \rho_1$, are defined, using the density log data, the lithological data and calibrated values of the absorption coefficients for the compression constituent of longitudinal wave. Hence, coefficient of the granular permeability, taking into account the previous formula, is as follows: $K_g = (\Phi_g \Omega D_o \lambda')/kTP^2$, where the parameter P is calculated by means of formula: $P = \Phi_g^{-m}$, moreover m=1.82 (for the terrigenous rocks) and m=2.03 (for the carbonate rocks). Then the residual water saturation coefficient for the porous medium can be defined according to: $k'_{r.w.}(\Phi^{1/2}\tau')/(^2 K_g)^{1/2} (1-\Phi_g)P$, where $\tau'$—the average thickness of the lamina of the fixed water.

For the model of the fracture-containing rock (or the fracture-brittle element of the deformable solid medium) the subhorizontal fissuring caused by the microfissures of the limited length, is characterized by means of such parameter as the linear density of fractures ratio, which is calculated here according to: $L_{d.f.} = (1,2kTl)/\Omega D\eta$, where l—the average length of microfissures; D—the diffusion constant of vacancies. Then the fissured porosity coefficient is calculated, using the formula: $\Phi_f = L_{d.f.} b_f$, where $b_f$—the average width (or opening) of microfissures. The opening fractures is calculated according to: $b_f = b_o \exp[\beta_f(p_{bed.} - p_{min.})]$, where $b_o$—the initial width of microfractures; $b_f$—the fissured compressibility coefficient; $p_{bed.} - p_{min.}$—the bedded and lateral mining pressures, respectively. At the same time the fissured permeability coefficient can be represented as follows: $K_f = (L_{d.f.} b_f^3 \cdot 10^{-6})/12$. Hence, the residual water saturation coefficient is defined according to: $k'''_{r.w.} = (\Phi_f^{1/2}\tau')(^2K_f)^{1/2}(1-\Phi_f)$, where $\tau'$—the average thickness of the lamina of the fixed water.

Finally, the fluid saturation coefficients of the rock are calculated according to the formula: $k'''_{f.s.} = (1 - k'''_{r.w.})$. If for the obtaining of the parametrical estimates of the reservoir properties (such as the permeabilities coefficients $K_g$ and $K_f$), the theological parameters values (such as the coefficients of dynamical viscosity $\lambda'$ and $\eta$) are calculated previously, then the values of the parameters T, $D_o$, D, $b_f$, $p_{bed.}$, $p_{min.}$, $\tau'$, $\tau''$ must be obtained additionally. So, for example, Kelvin's temperatures (T) defines out of the temperature log data, and for the calculation of the opening of the microfissures the oil-field data concerning bedded ($p_{bed.}$) and mining ($p_{min.}$) pressures are used.

The totality of the above-mentioned parametrical estimates for the determining of the oil-and-gas deposit image guarantees the correct identification of the images of various oil-and-gas deposits. After the reception of the estimates of the oil-field parameters procedures of the identification of the oil-and-gas deposit is implemented by means of the optimal deciding rules based on the Neyman—Pearson's criterion.

The example of the experimental tests and the applied use of the declared method. For the borehole seismic investigations such technical devices, as digital recorders, explosive sources, three-component one-modular sondes and other equipment have been used. The methods of the seismic data acquisition included: the excitation of the direct longitudinal wave by the near-surface source of the oscillations (the one shotpoint), digital registration of the longitudinal wave using borehole and check three-component one-level sondes and detailed observations ($\Delta H$=2.5–5 m) of the 3C VSP for the recording the displacement vectors for longitudinal and shear (or transverse) waves on the perspective in the productive relation depth interval in the investigated borehole.

The results of the experimental diagnosis of the dynamical, theological, absorbing, reservoir and fluid-properties of the rocks according to the detailed seismic investigation data, received on perspective in the productive relation an interval of depths (5030–5130) m in exploratory borehole of Lopushna-13, which is located in the underthrust zone of the Pokutsko-Bukovynsli Carpathians (Ukraine), are shown on FIGS. (1–6).

Figure 5:
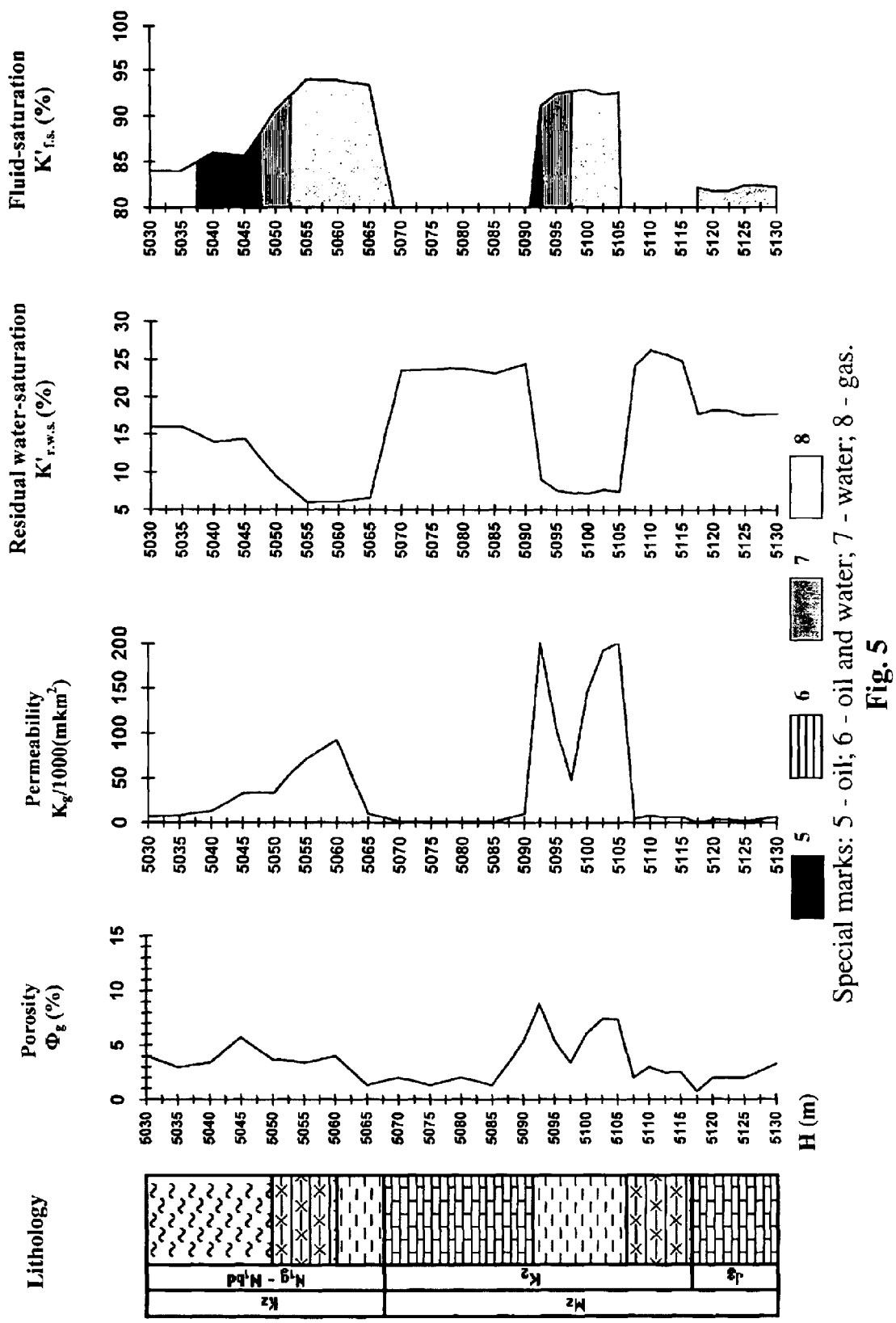
FIG. 5—the reservoir and fluid-saturation parameters of the rocks for the borehole of the Lopushna-13: the coefficients of porosity ($\Phi_g$), granular permeability ($K_g$), residual water saturation ($k'_{r.w.}$) and fluid saturation ($k'_{f.s.}$) with the fluid-type identification, filling the pore volume of the reservoir, which are compared to the lithology.
Figure 6:
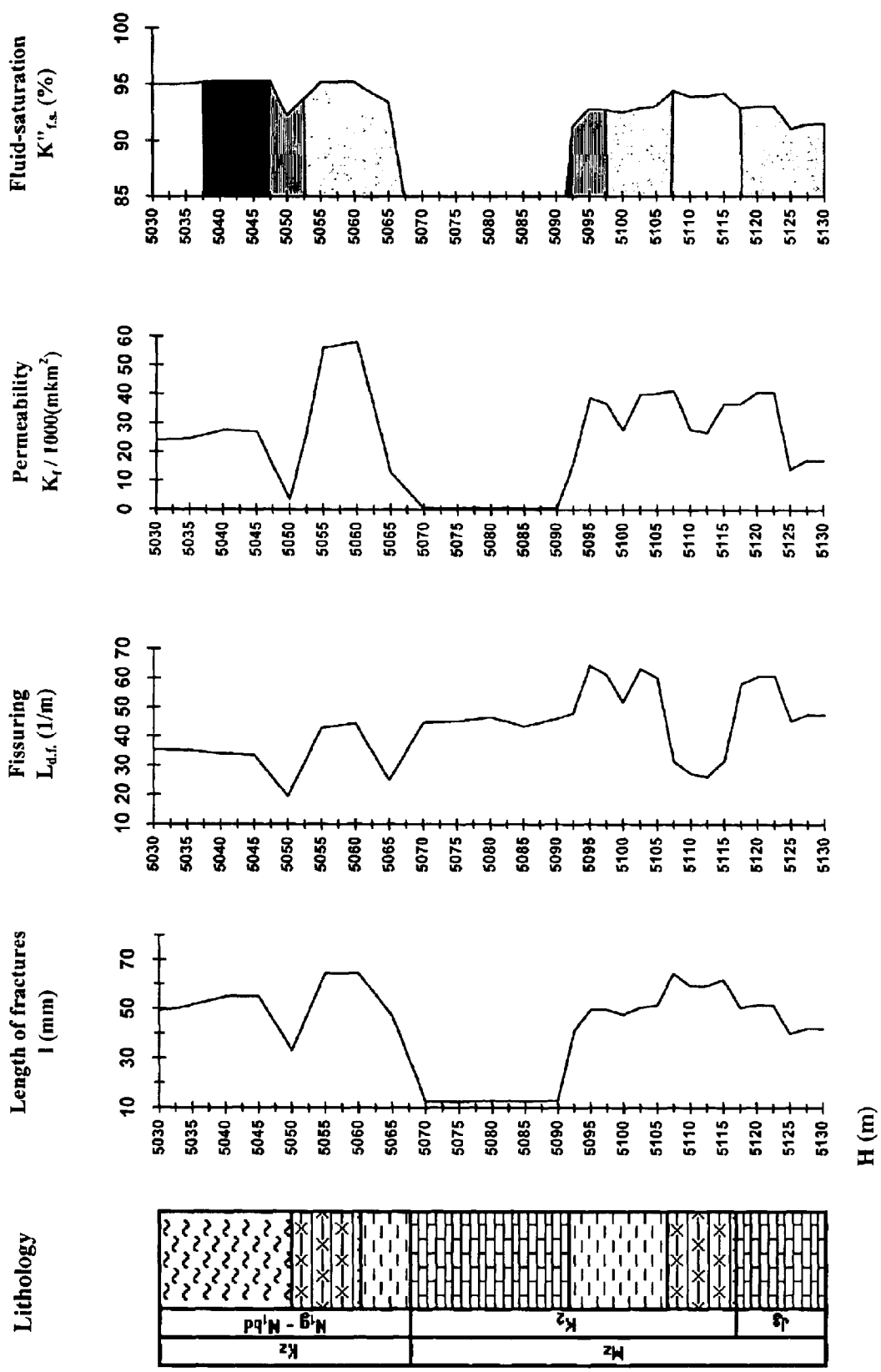
FIG. 6—the reservoir and fluid-saturation parameters of the rocks for the borehole of the Lopushna-13: the average length of fractures (l), the linear density of fractures ratio ($L_{d.f.}$), the coefficients of fissured permeability ($K_f$) and fluid saturation ($k''_{f.s.}$) with the fluid-type identification, filling the fissured volume of the reservoir, which are compared to the lithology.

The geological problem which has been formulated before the seismic survey in the borehole Lopushna-13 consisted in obtaining the quantitative estimates of the reservoir and fluid-saturated parameters for the possible perspective in the oil-and-gas-bearing relation thickness of Cretaceous depositions (argillites), which is located at the depths (5092.5–5105) m. The cap rock is located above the latter (low-porosity and low-permeable limestone). The results of the borehole seismic survey for the argillaceous thickness have shown the relatively high values of: granular porosity—$\Phi_g$=(3.4–8.8)%; fissuring—$L_{d.f.}$=(48–65)m$^{-1}$; granular permeability—$K_g$=(49–202)*10$^{-3}$ mcm$^2$ and fissured permeability—$K_f=(16–40)*10^{-3}$ mcm², which was accompanied by of the most part of the layer with such values of the fluid saturation coefficients: $k'''_{f.s.}=(91–93)\%$ (FIGS. 5–6).

Thereby in the upper part of the layer (at depth of 5092.5 m) the zone of the tectonic dislocation has been diagnosed which is distinguished by the values of the interval coefficients of absorption $\alpha'''(\omega)$ and the quality factors $Q'''(\omega)$. Evidently the tectonic dislocation has changed sealing the deposit, earlier existing here, as the result of which only the residual oil in the upper part of the layer [at the depths of (5092.5–5095)m] has been preserved. The subsequent oil-field tests of the given interval of depths have proved the above - mentioned prediction.

Figure 3:
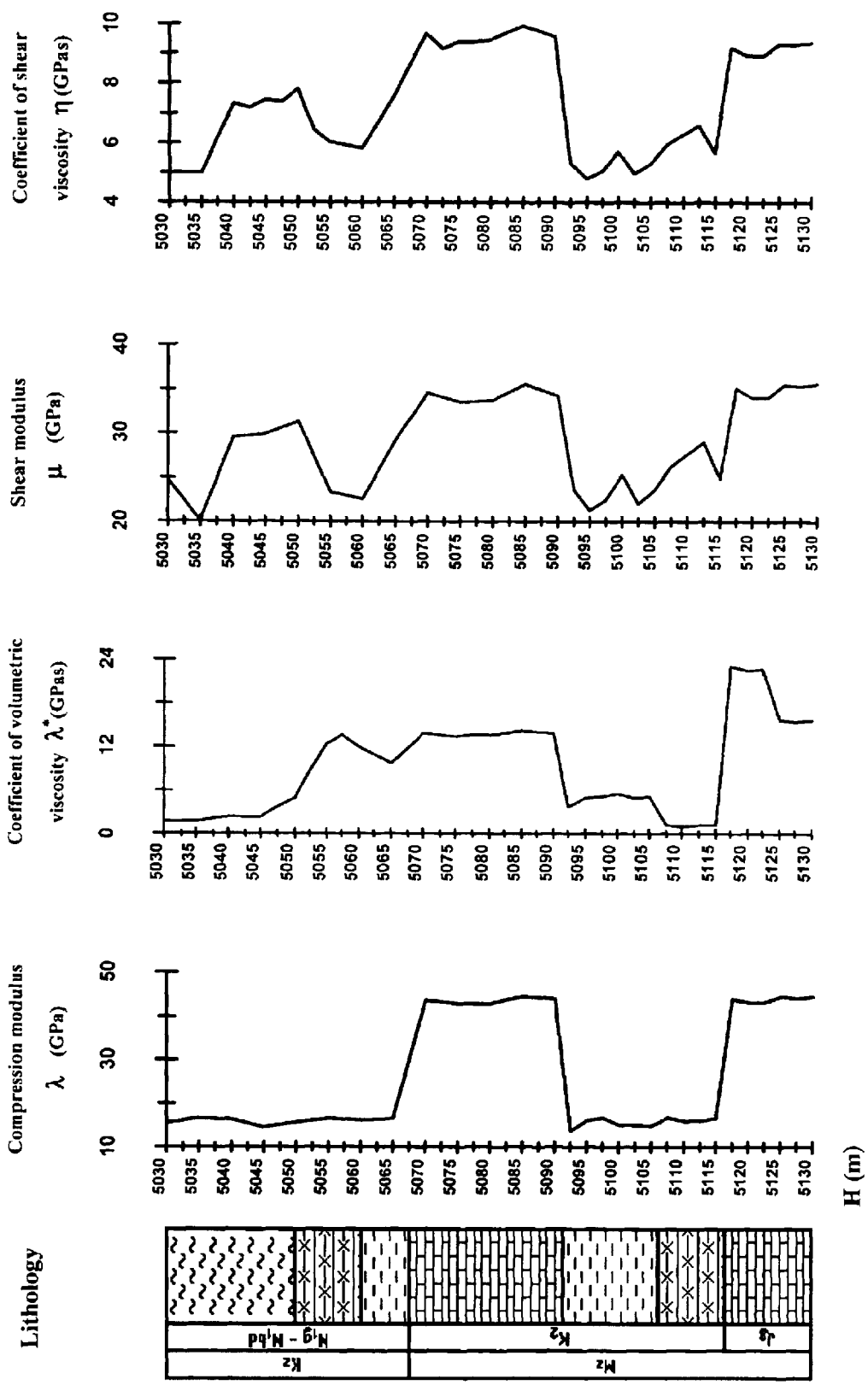
FIG. 3—the rheological parameters of the rocks and parameters of the initial amplitudes effective attenuation of seismic wavelets for the borehole of the Lopushna-13: the coefficients of volumetric ($\lambda^{\cdot}$) and shear ($\eta$) dynamical viscosity jointly with the initial amplitudes diagrams of $\{\ln A_o^{\cdot,"}[H]\}$ by means of which defines bedded coefficients of the effective attenuation $\{\bar{a}^{\cdot,"}_{e\!f\!f.att.}(\ln A_o^{\cdot,"})\}$, which are compared with the lithology.
Figure 4:
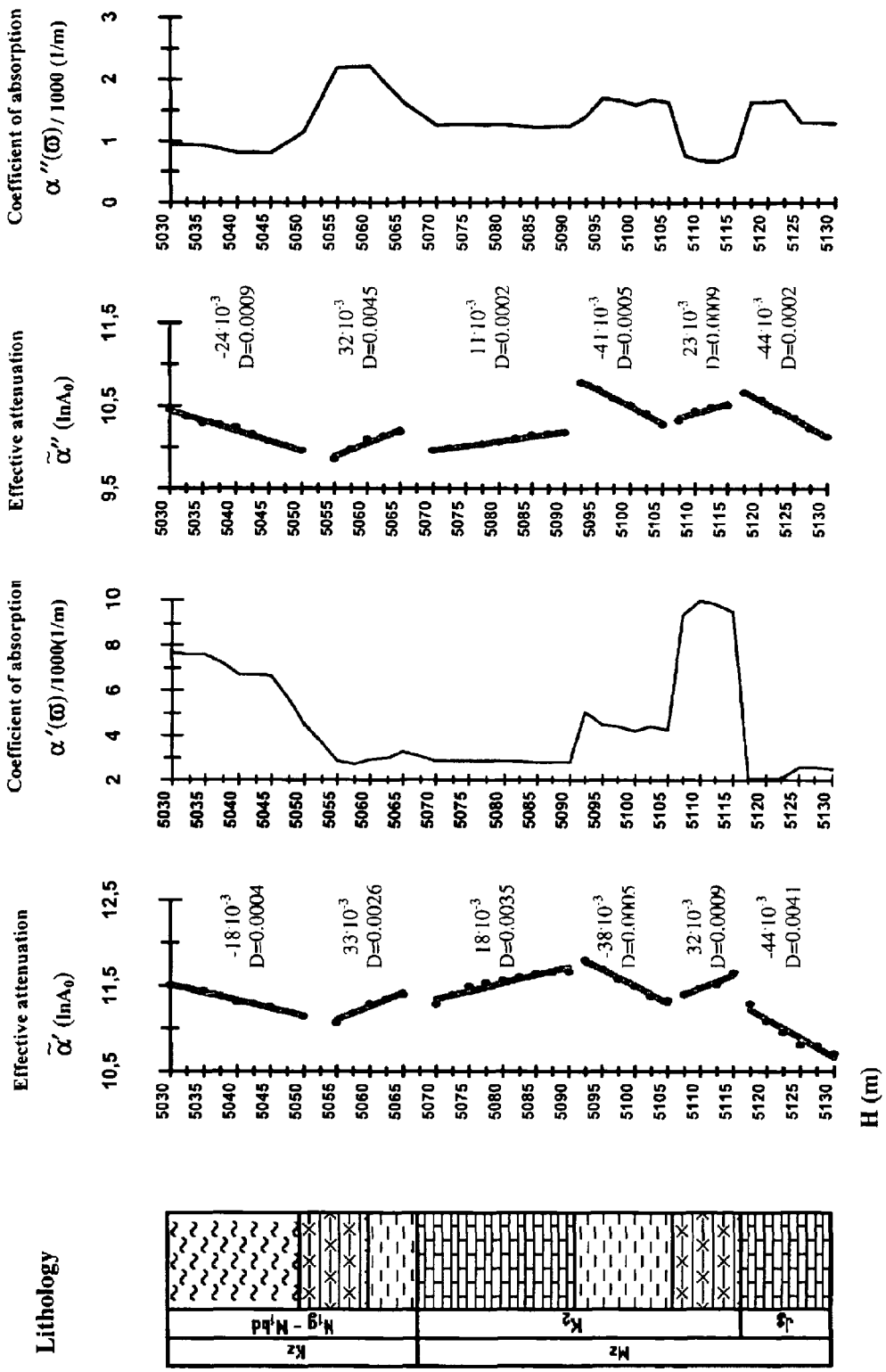
FIG. 4—the absorption parameters and the elasticity modules of the rocks for the borehole of the Lopushna-13: $\{a^{\cdot,"}(\bar{\omega})\}$—the absorption coefficients (for the characteristic frequency $\bar{\omega}=2\pi 20(Hz)$) and diagrams of the elastic modules logarithms $\text{Ln}(\lambda+2\mu)[H]$, $\text{Ln}\mu(H)$ by means of which the bedded attenuation coefficients $(\bar{\alpha}^{\cdot,"})$are defined, characterizing gradient properties, which are compared with the lithology.

Owing to the detailed investigations by the seismic survey method in the borehole of Lopushna-13 the other zones with the anomalous values of the rheological and absorbing parameters of the rocks also have been identified (FIGS. 3–4). According to the totality of the significant oil-field parameters (necessary for the identification of the oil-and-gas deposit image) at the depths of (5030–5065) m perspective layers have been detected which consist from the terrigenous rocks of the Neogene.

Here the inhomogeneous reservoir is presented by the following parameters: $\Phi_g=(1.3–5.7)\%$; $L_{d.f.}=(19–44)m^{-1}$; $K_g=(7.9–92.6)*10^{-3}$ mcm²; $K_f=(3.5–57.9)*10^{-3}$ mcm² and $k'_{r.w.}=(6–16)\%$ (FIGS. 5–6). The oil-and-gas deposit has the trilaminar disposition of fluid, which fills the pores and fractures of the rocks. In particular, the reservoir at the interval depths of: (5030–5037.5) m is gas-bearing; (5037.5–5047.5) m is oil-bearing; (5047.5–5052.5) m is water-bearing when the coefficients of fluid saturation vary within the following limits: from 84% up to 94% (for the granular part) and from 92% up to 95% (for the fissured part). It is necessary to indicate, that the above-mentioned oil deposit has been missed earlier when only data of the standard complex of the well logging methods were used.

The bedded coefficients of the effective attenuation($\alpha'''_{eff.att.}$), absorption [$\alpha'''(\omega)$], attenuation ($\overline{\alpha}'''$) and dispersion ($\alpha'''_{disp.}$) for the compression and shear constituents of longitudinal wave, which are compared with lithology and data of the field measurements for bedded pressures and temperatures (the borehole of Lopushna-13), are represented on the Table 1.

the presence of the zones with the anomalously high pressure in the above-mentioned layers, which is proved by the direct oil-field measurements of the bedded pressures and temperatures.

Then, using the totality of the reservoir and fluid-saturated parameters of the rocks, the depths interval of (5035–5050) m in the borehole of Lopushna-13 was recommended for the baring of productive layers. The tests have passed successfully with the obtaining of the oil influx with the initial flow rate of 0.8 m³/day out of the borehole that before had been considered as nonproductive.

The results of the experimental tests allow us to predict the areas of the applied utilization of the declared method of wave diagnostics of the oil-and-gas deposit, in particular:

during the exploration drilling when it is necessary to detect the reservoir, cap rocks and the presence of the oil-and-gas-bearing layers;

in the development drilling during the reservoir engineering of the oil-and-gas deposits when it is necessary to define more precisely the reservoir parameters of the productive layers, the quality of cap ricks, quantitatively to estimate the hydrocarbon saturation and to determine the locations of the gas-and-oil-water contacts;

for the monitoring of the reservoir engineering of the oil-and-gas deposits.

What is claimed is:

1. A method of wave diagnostics of the oil-and-gas deposit which includes the excitation of the seismic waves by the near-surface sources of the oscillations, the recording of displacement vectors for the direct longitudinal and shear waves for the each observation point by means of the three-component seismic profiling along the depth of the investigated borehole and the processing of their kinematic and dynamical parameters, characterised in that one near-surface source of the oscillations executes in the vicinity of the borehole the longitudinal wave excitation, and their reception is carried out simultaneously in the investigated and check boreholes;

after orientation in space of three-component observations data the monotype time signals for the compression and shear constituents of the direct longitudinal wave are extracted out of the seismic wavelets which were registered on the axial and tangential components of the displacement vector by the borehole and check devices respectively;

TABLE 1

| Depth | The compression constituent $*10^{-3}$ [m$^{-1}$] | | | | The shear constituent $*10^{-3}$ [m$^{-1}$] | | | | | The bedded pressure & |
|---|---|---|---|---|---|---|---|---|---|---|
| H [m] | $\tilde{\alpha}'_{eff.att.}$ | $\alpha'(\tilde{\omega})$ | $\overline{\alpha}'$ | $\tilde{\alpha}'_{disp.}$ | $\tilde{\alpha}''_{eff.att.}$ | $\alpha''(\tilde{\omega})$ | $\overline{\alpha}''$ | $\tilde{\alpha}''_{disp.}$ | Lithology | temperature |
| 5030–5050 | −18.2 | 6.7 oil | 14.1 | −39.0 | −24.3 | 0.9 | 14.1 | −39.3 | Aleurolite | 7.8 MPa 106° C. |
| 5055–5065 | 33.4 | 2.9 water | 17.4 | 13.1 | 32.1 | 2.4 | 17.4 | 11.9 | Sandstone, argillite | |
| 5070–5090 | 18.3 | 2.8 water | 1.2 | 14.3 | 11.5 | 1.3 | 1.2 | 9.0 | Limestone | |
| 5092.5–5105.0 | −38.0 | 4.5 water, oil | 2.3 | −44.8 | −40.8 | 1.6 | 2.3 | −44.7 | Argillite | 7.6 MPa 106° C. |
| 5107.5–5115.0 | 32.5 | 9.7 gas | −3.2 | 26.0 | 23.5 | 0.7 | −3.2 | 26.0 | Clayey sandstone | |
| 5117.5–5130.0 | −44.1 | 2.3 water | 2.4 | −48.8 | −44.2 | 1.5 | 2.4 | −48.1 | Dense limestone | 7.8 MPa 108° C. |

The measured coefficients of the effective attenuation ($\alpha'''_{eff.att.}$) and dispersion ($\alpha'''_{disp.}$) have the negative numerical values in the depth intervals of: (5030–5050) m, (5092,5–5105) m and (5117,5–5030) m. The latest characterizes further by means of processing the kinematic parameters of the direct longitudinal and shear waves calculate interval values of longitudinal and shear modules of the elasticity;

after the decoding of the monotype time signals quantitative estimates of their significant dynamical parameters are defined for the borehole and check data, and respectively for the each observation point and constituent of the direct longitudinal wave, moreover the accuracy of the obtained estimates of the dynamical parameters is monitored by means of the computer modelling of the seismic signals;

then, carrying out the correction of the corresponding parameter because of the changes of the wave excitation conditions during multiple excitation of the oscillations and the filtration of the seismic signals in the covering thickness of the rocks, defines the dynamical parameters of the impulse responses, values of the coefficients of volumetric and shear dynamical viscosity and absorption for the compression and shear constituents of the layers, when the calibrated values of the absorption coefficients for the compression constituent are used the in the capacity of the indicator for the presence estimates and the fluid-type identification, filling the pore and fissure volume in the rocks, and also values of the bedded coefficients of the effective attenuation, attenuation and energy dispersion of longitudinal wave are calculated;

then the obtained petrophysical data are converted into bedded values of the parameters of the reservoir and fluid-saturated properties of the layers with the aim of the necessary totality receipt of significant oil-field parameters for the identification of the oil-and-gas deposit image.

2. The method according to claim 1 is characterized in that the check borehole is located on the trajectory of propagation direct longitudinal or shear wave between investigated borehole and the oscillations excitation point at distance 20–50 m from the last.

3. The method according to claim 1 is characterized in that location depth of the explosive charge or air gun used for the oscillations excitation in the near-surface borehole is defined out of the separation condition of the direct longitudinal wave from the satellite waves, which are formed in the time of reflection of last from free earth surface.

4. The method according to claim 2 is characterized in that the recording of the displacement vectors of the direct longitudinal or shear wave are carried out simultaneously in the investigated and check boreholes, moreover in the investigated borehole with the help of the three-component multilevel borehole sonde sequentially moving along borehole depth, and in the check borehole by means of stationary located three-component one-level sonde.

5. The method according to claim 4 is characterized in that the detailed three-component profiling in the investigated borehole is executed with the step of the discrete observations every 2.5–5 m.

6. The method according to claim 1 is characterized in that the monotype time signals extraction for the compression and shear constituents out of the observed experimentally seismic wavelets on the axial and tangential components of the displacements vector for the direct longitudinal wave is realized—for the compression constituent by means of deduction the seismic wavelets, observed on the axial component, with weight coefficient out of the seismic wavelets, observed on the axial component, whereas for receipt of the shear constituent—seismic wavelets, observed on the tangential component, are normalized with the same weight coefficient for each observation point in the investigated and check boreholes.

7. The method according to claim 1 is characterized in that the interval values calculation of longitudinal and shear modules of the elasticity is made by means of the coprocessing of longitudinal and shear waves velocities and the density logging data.

8. The method according to claim 1 is characterized in that decoding is realized by means of the parametrical analysis of the monotype time signals for the compression and shear constituents of the direct longitudinal wave with receipt of the quantitative estimates of their significant dynamical parameters for the borehole and check data.

9. The method according to claim 8 is characterized in that in quality of the significant dynamical parameters of the monotype time signals for the compression and shear constituents of the direct longitudinal wave makes use of the initial amplitudes, steepness exponents, attenuation coefficients, instantaneous frequencies and initial phases.

10. The method according to claim 1 is characterized in that with the purpose of the receipt of dynamical parameters of the layers impulse responses for given observation point executes numerical correction of the dynamical parameters estimates of the monotype time signals for borehole observations by means of the utilization of the analogous parameters of signals for the check observations, and further by means of the layer-stripping method is realized the correction of revised estimates of the dynamical parameters for the given observation point by means of use the analogous parameters of the monotype time signals for the previous observation point of lengthways depth of the borehole.

11. The method according to claim 1 is characterized in that for qualitative indication of the presence and fluid type—oil, gas or water, filling the pore and fissured volume in the rocks, quantitative values of the bedded absorption coefficients for the compression constituent of the direct longitudinal wave are compared with the calibrated values of the above-mentioned coefficients for the oil-gas- or water-saturated rocks.

12. The method according to claim 1 is characterized in that the calculation of bedded coefficients of the effective attenuation is realized by means of statistical processing of the interval values of the initial amplitudes previously corrected owing to the conditions change in the time of multiple excitation of the oscillations, and owing to the geometrical divergence of the wavefront, further is defined the bedded attenuation coefficients by means of the statistical processing of the interval values of the longitudinal modules of the elasticity, and also is defined bedded absorption coefficients, for that the absorption data average out statistically on depths intervals of the layers, respectively for the compression and shear constituents of the direct longitudinal wave.

13. The method according to claim 1 is characterized in that the calculation of the oil-field parameters collection of the reservoir, such as bedded values of the coefficients of porosity, granular and fissured permeabilities, residual water saturation and fluid saturation are used bedded values of the coefficients of volumetric and shear dynamical viscosity jointly with values of the temperatures, diffusion constants, meanderingness of pore channels coefficients and others.

* * * * *